T. L. HARKINS.
TIRE SPREADER.
APPLICATION FILED FEB. 17, 1920.
1,371,480.
Patented Mar. 15, 1921.
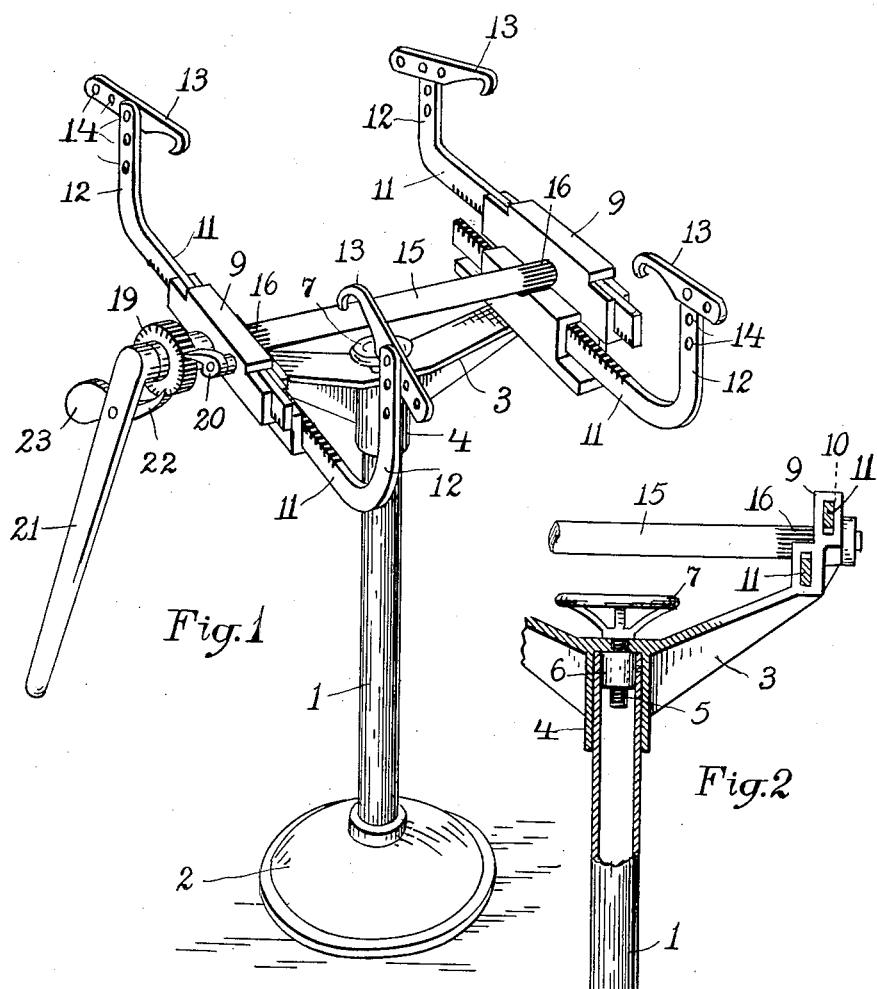
Fig.1
Fig.2
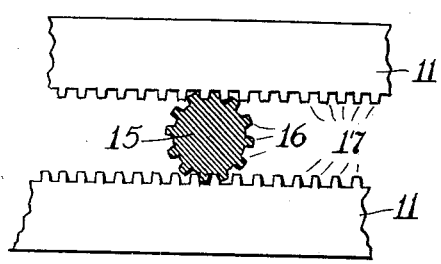
Fig.3
Inventor,
Thomas L. Harkins;
By A. B. Upham,
Attorney.

UNITED STATES PATENT OFFICE.

THOMAS L. HARKINS, OF BOSTON, MASSACHUSETTS.

TIRE-SPREADER.

1,371,480. Specification of Letters Patent. Patented Mar. 15, 1921.

Application filed February 17, 1920. Serial No. 359,257.

*To all whom it may concern:*

Be it known that I, THOMAS L. HARKINS, a citizen of the United States, and a resident of Boston, in the county of Suffolk and Commonwealth of Massachusetts, have invented certain new and useful Improvements in Tire-Spreaders, of which the following is a full, clear, and exact specification.

The purpose of this invention is the construction of a convenient, easily controlled, economical and efficient apparatus for spreading the edges of a pneumatic tire to give access to its interior for cleansing and repairs.

In the drawings forming part of this specification, Figure 1 is a perspective view of apparatus embodying my improvements. Fig. 2 is a sectional elevation of a portion of the same. Fig. 3 is a detail view on a larger scale of a part thereof.

The apparatus is designed to be supported upon a standard 1 having a base 2 bolted to the floor. Rotatably mounted upon the upper end of the standard 1, which is preferably made tubular for the sake of lightness, is a Y-frame 3 whose socket 4 is loosely seated on the extremity of the standard, but can be made fast thereon by means of a screw 5 engaging a nut 6 fast in the standard, and turned by a hand wheel 7.

Attached to each end of the Y-frame 3 is a casting 9 which is formed with two parallel rectangular holes 10 each fitted to slidably receive a similar shaped bar, as 11. Each bar 11 is bent up at one end to form an arm 12 to whose upper end is pivoted a claw 13. The claws and arms are each formed with a plurality of bolt holes 14 in order to vary both the heights and the lengths of the claws, suitable bolts or pins being introduced through these holes for pivotally holding the claws and arms together.

Rotatably supported at its ends by the castings 9 is a round bar 15 having elongated grooves cut near its ends to form spur gears 16 for engaging adjacent bars 11 in which are rack teeth 17 cut therein. One end of the bar 15 is prolonged beyond the casting 9 thereat, and has a rack wheel 19 fastened thereon with which a detent 20 is adapted normally to engage in a manner to hold the wheel and bar from turning backward and permitting the arms and hooks 12, 13 to move toward the shaft or bar 15.

Revolubly mounted on the extremity of the bar 15 beside the ratchet wheel 19, is a lever arm 21 provided with a pawl 22 pivoted thereto and formed with a counterweight 23. By swinging the lever arm 21 downward, its pawl engages the ratchet wheel and forcibly turns both it and the bar or shaft 15, thereby moving the rack bars 11 and their arms 12 powerfully away from the shaft 15.

In using this apparatus, the tire to be repaired is located upon the two castings 9, and the claws 13 engaged with the beads of the tire. Then the lever arm 21 is swung up and down until the claws have been moved far enough to stretch the tire wide open to suitably expose its interior. If the workman wishes to treat the tire from another direction, instead of walking around to another side of the apparatus, he unloosens the hand wheel 7 and revolves the entire apparatus upon its standard until the desired position is obtained.

When one section of the tire has been treated, he presses down upon the lever arm 21 until he can disengage the detent from the ratchet wheel 19, and then permits the lever arm to swing backward or disengages the weighted pawl 22 from the ratchet wheel 19 and allows the arms 12 and claws 13 to move inward by the pull of the spread tire. Then the claws are disengaged from the tire, and the latter revolved to present the desired place for further treatment, and the claws reëngaged and forced apart as before.

Thus made, this tire stretcher acts in a powerful and positive manner, is readily operated, conveniently adjusted, and leaves the tire practically free from obstructing parts.

What I claim is:

1. A tire spreader comprising a standard, a yoke supported by said standard, and having arms provided with guide ways, two parallel bars slidably supported in said guide ways at the end of each of said arms, a transversely disposed shaft connected with said bars for longitudinally moving them, claws pivotally connected with the outer ends of said bars, and means for forcibly rotating said shaft.

2. A tire spreader comprising a standard a yoke rotatably supported by said standard, the yoke having at each of two opposite ends a member provided with two rectangular guide holes, all the guide holes being parallel, a bar slidably fitting each hole having an upright arm at one end, the arms of the bars in each member being opposite to each other, claws pivotally carried by said arms, a shaft having spur teeth near each end, and means for forcibly turning said shaft, said bars having teeth for engaging the teeth of said shaft for simultaneously sliding the arms at one side away from those at the other side.

In testimony that I claim the foregoing invention, I have hereunto set my hand this fourteenth day of February, 1920.

THOMAS L. HARKINS.